United States Patent [19]
Van den Noort

[11] Patent Number: 5,725,326
[45] Date of Patent: Mar. 10, 1998

[54] MOVABLE DAM

[76] Inventor: Johann Heinrich Reindert Van den Noort, Zilverschoon 47, 8265 He Kampen, Netherlands

[21] Appl. No.: 599,601

[22] Filed: Feb. 9, 1996

[30] Foreign Application Priority Data

Feb. 9, 1995 [NL] Netherlands ............... 9500237

[51] Int. Cl.⁶ .................................................. E02B 7/26
[52] U.S. Cl. ........................... 405/104; 405/96; 405/103
[58] Field of Search .................. 405/96–107, 80–87, 405/91, 92

[56] References Cited

U.S. PATENT DOCUMENTS

| | | | |
|---|---|---|---|
| 1,750,901 | 3/1930 | Newell | 405/104 |
| 2,991,625 | 7/1961 | Anderson et al. | 405/104 |
| 3,336,757 | 8/1967 | Valdespino | 405/96 |
| 4,449,851 | 5/1984 | Combes et al. | 405/96 X |

FOREIGN PATENT DOCUMENTS

| | | |
|---|---|---|
| A 61-49013 | 3/1986 | Japan. |
| 9201601 | 4/1994 | Netherlands. |

*Primary Examiner*—Dennis L. Taylor
*Attorney, Agent, or Firm*—Lahive & Cockfield, LLP; Anthony A. Laurentano

[57] ABSTRACT

The invention relates to a movable dam for a water-course. This dam comprises a chamber which, for example, is formed in a dike or alike and wherein a buoyant body is housed supporting a vertical retaining wall. At its top the chamber communicates with the surroundings through a slot receiving the vertical retaining wall, whereas further a filling channel connects to said chamber and extends towards the watercourse. It is possible that a discharge channel is connected to the lower part of the chamber. Further sealing means may be provided.

5 Claims, 1 Drawing Sheet

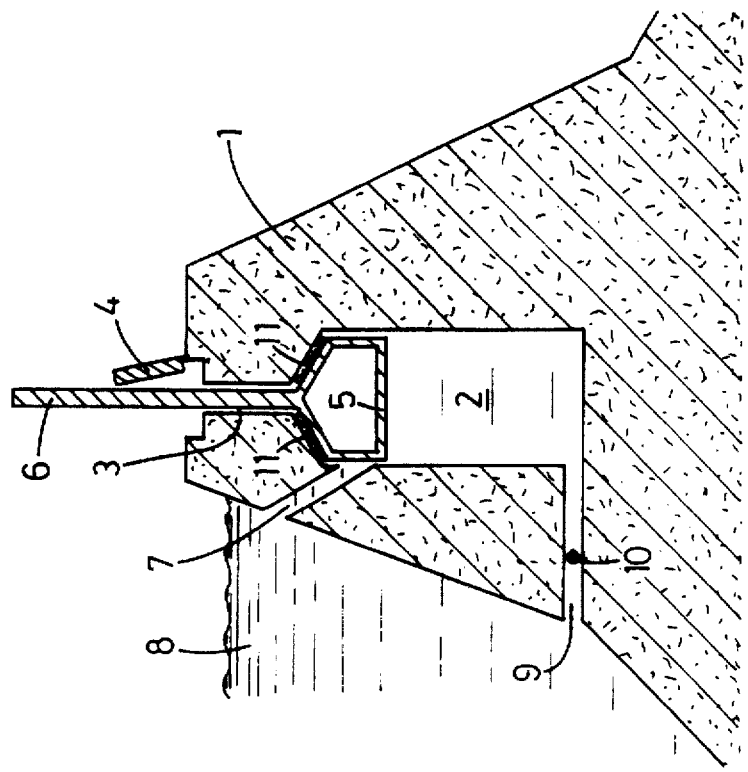
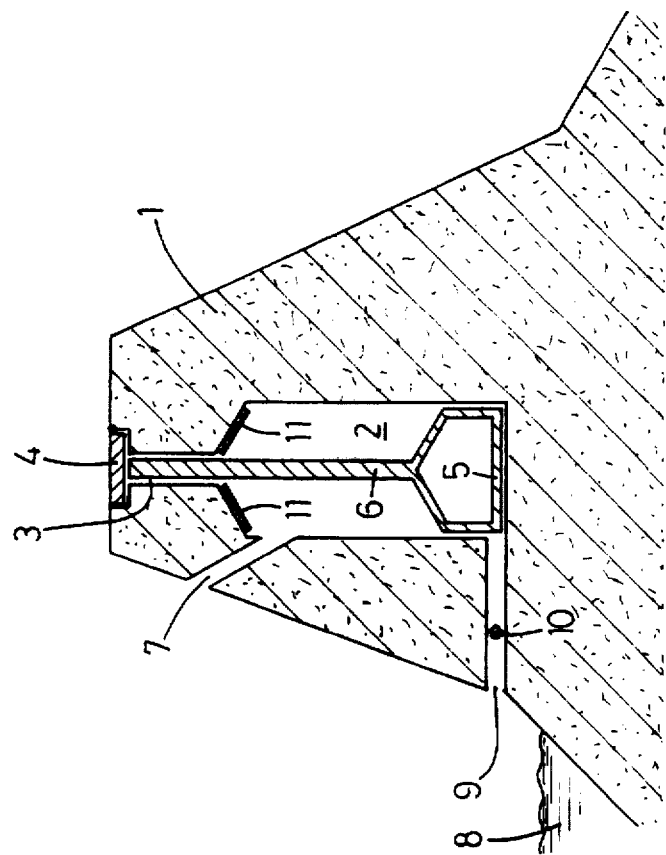

MOVABLE DAM

BACKGROUND OF THE INVENTION

The invention relates to a movable dam for a watercourse. In times of high water a movable dam can be transferred from a low position towards a high position such as to take account for the occurring high tide. Known movable dams make use of complicated mechanical, hydraulic or pneumatic constructions such as to transfer a movable section of the dam from a low position towards a high position and vice versa.

Compared to conventional dikes movable dams posess the advantage that they constitute a dam only then when it is really necessary. When providing conventional dikes the dimensions (especially the height) basically have to be chosen taking into account the highest water level that can be expected. Generally this leads to wide dike bodies constituting a considerable interference with the environment. Thus it will be clear that movable dams offer advantages compared to such high dikes. However, a disadvantage is their technical complexity and thus their cost.

It is an object of the invention to provide a movable dam which combines the advantages of movable dams with a simple, but nevertheless effectively operating construction.

SUMMARY OF THE INVENTION

Thus according to the invention the movable dam is characterised by at least one vertical retaining wall which at its lower side is provided with a buoyant body housed in a chamber, said chamber at its top communicating with the surroundings through a slot receiving the vertical retaining wall, whereas further a filling channel connects to said chamber and extends towards the watercourse.

Preferably the movable dam according to the invention can be applied in a dike body. At low tide the buoyant body rests upon the bottom of the chamber, which chamber is provided internally (and thus not visible) of the dike body. In this position of the buoyant body the upper edge of the vertical retaining wall is positioned in the slot and thus at or below the level of the upper side of the dike body. In this position the movable dam is not operative nor visible. When the level of the water surpasses a certain height the water will flow into a chamber through the filling channel such as to move the buoyant body upwardly in the chamber. As a result the vertical retaining wall moves upwardly through the slot towards a position in which it extends above the dike body. Like this at times of high tide automatically an increase of the effective dike height is obtained. When the water level decreases again the buoyant body and associated retaining wall will descend also until again reaching the starting position.

As noted the movable dam according to the invention preferably can be applied in a dike body. However, other locations are conceivable to, such as at the base of a dike body for providing already a first protective barrier for the very dike body, at quays or at locations where dikes, quays and alike are lacking completely.

According to a preferred embodiment of the dam according to the invention the channel debouches in the top section of said chamber. This embodiment offers the special advantage that the chamber will be completely filled at the moment that water flows into the chamber through the filling channel, such that the dam is directly moved from its starting or resting position towards its highest operative position. If the filling channel would debouche in the lower section of the chamber the vertical retaining wall would arise gradually in correspondence with the increase of water level.

Further it is advantageous if, starting from the chamber, the filling channel extends inclined upwardly. As a result the constructive advantage is obtained that the chamber can be positioned in the dike body at a sufficiently covered depth without the risk that at the top of the chamber a section of the surrounding dike construction or alike is created which is to weak.

In respect of the ease of use of the dam it is further of advantage that a discharge channel connects to the lower part of the chamber. Especially if the filling channel debouches in the upper part of the chamber, emptying the chamber can be effected using such a discharge channel. At one hand such discharging may occurr automatically, for example if in the discharge channel a non-return valve is provided which opens if the level of the watercourse (for example a river) has decreased sufficiently, whereas at the other hand emptying the chamber can occurr using a pump provided in the discharge channel. In the latter case the discharge channel does not necessarily have to extend downwardly starting from the chamber, this in contrast to the former case.

To obtain a reliable operation of the dam according to the invention it is further advantageous that sealing means are provided for creating a seal between the chamber inner wall and the buoyant body or retaining wall, respectively. If such sealing means are not present there is the risk that water entering the chamber through the filling channel escapes along the buoyant body and through the slot at the rear side of the vertical retaining wall under influence of the high pressure due to the high tide.

By the way it is noted that for reasons of security additional means can be provided to remove any leaking water passing the dam despite the sealing means. By way of example such means may comprise pumps.

In a constructively advantageous embodiment of the dam according to the invention seal means are provided at the upper side of the buoyant body and/or at the part of the chamber inner wall cooperating therewith. When the buoyant body is moved upwardly due to the water flowing into the chamber through the filling channel the upper side of the buoyant body will contact the upper side of the chamber. With an increase of the level of high tide the force with which the buoyant body engages the inner wall of the chamber will increase. As a result the effectivity of the sealing means will increase also such as to offer a reliable seal, also at extremely high tide.

As an example of such sealing means strips of rubber are mentioned which, for example, can be applied to the upper side of the buoyant body, to the inner wall of the chamber are to both elements.

Generally a movable dam according to the invention will be applied at elongate dike sections or alike. Thus it is preferred that the dam according to the invention comprises a number of retaining walls positioned alongside each other and sealingly engaging each other. The way in which the retaining walls engage each other sealingly is known per se, for example in the field of pile plankings.

Finally, to increase the safety of the dam it is preferred that the outer side of the slot is closed by a movable closure, such as a well cover or alike, which can be opened by the retaining wall. For example such a well cover may be connected hingedly to the dike body or alike and may be urged to an open position by the retaining wall while it moves upwardly. When the dam is inoperative the well cover closes the slot such that there is no risk of foreign matter entering the slot. Further as a result the dike or alike remains fully passable when the dam is inoperative.

Filtrations means can be applied in the filling channel and/or discharge channel to prevent the entrance of pollutions and alike in the chamber. Especially if sealing means are provided such pollutions could have a disturbing influence on the function of the movable dam according to the invention.

Hereinafter the invention will be elucidated referring to the drawing in which an embodiment of the movable dam according to the invention is illustrated.

BRIEF DESCRIPTION OF THE DRAWINGS

FIG. 1 illustrates an embodiment of the movable dam according to the invention as applied in a dike body in an inoperative position, and FIG. 2 shows the dam of FIG. 1 in an operative position.

DESCRIPTION OF THE ILLUSTRATED EMBODIMENTS

In FIG. 1 a dike body 1 is shown in section. In the dike body an internal chamber 2 is created. For example the chamber 2 may comprise a concrete gutter or alike.

At its top the chamber 2 communicates with the surroundings through a slot 3. At is outer side (upper side) the slot 3 is closed by a hingeable cover 4.

In the chamber 2 a buoyant body 5 is provided supporting a vertical retaining wall 6. The buoyant body 5 and retaining wall 6 may be manufactured of plastic material.

To the top section of the chamber 2 a filling channel 7 connects which, starting from the chamber 2, extends inclined upwardly towards that side of the dike 1 which faces a watercourse, such as a river 8.

To the lower part of the chamber 2 a discharge channel 9 connects in which a non-return valve 10, indicated only schematically, is provided.

Further FIG. 1 shows that the inner wall of the chamber 2 at the upper side is provided with sealing means 11 which cooperate with the upper side of the buoyant body 5 in the position which will be described by means of FIG. 2.

In FIG. 1 the river 8 has a low water level. The chamber 2 is empty and the buoyant body 5 rests upon the bottom of the chamber. The retaining wall 6 is positioned within the slot 3 and cover 4 is closed. In this position the dam is inoperative. Moreover the dam is not or hardly visible.

While the water level of the river 8 rises said level will reach the outer side of the filling channel 7. At such a moment the chamber fills up and the buoyant body 5 is urged towards the position illustrated in FIG. 2. As a result of the high water level of the river the upward pressure on the buoyant body 5 is very large such that the upper side of the buoyant body 5 will firmly engage the seal 11 which, as appears from FIG. 1, is provided at the inner side of the upper wall of the chamber 2. As a result a proper seal between the buoyant body and the inner wall of the chamber 2 is obtained.

Due to the upward displacement of the buoyant body 5 also the vertical retaining wall 6 moves upward through the slot 3 and the upper edge of the vertical retaining wall 6 will leave said slot 3. Due to this the cover 4 is moved towards the opened position illustrated in FIG. 2, against the force of gravity. In the position illustrated in FIG. 2 the retaining wall 6 extends above the level of the dike 1, thus automatically providing an increase of the effective height of the dike 1. In this way the high water level of the river 8 is taken into account.

When the water level in the river falls again to the level shown in FIG. 1 the water will leave the chamber 2 through the discharge channel 9, such that the retaining wall 6 descends and assumes the inoperative position illustrated in FIG. 1.

instead of the embodiment of the discharge channel 9 with non-return valve 10 it is possible too that the discharge channel 9 comprises a pump. In such a case the discharge channel 9, starting from the chamber 2, may extend upwardly too.

It is not illustrated in the figures that the retaining wall 6 may be composed of a number of retaining walls positioned alongside each other and sealingly engaging each other, such that using the dam according the invention elongate dike sections may be secured.

Instead of the embodiment shown in FIGS. 1 and 2 it is possible too that the filling channel 7 and the discharge channel 9 comprise one single channel, for example at the position of the discharge channel 9. In such a case the buoyant body 5 with retaining wall 6 will, in correspondence with the rise of the water level of the river 8, move upwardly gradually.

The invention is not limited to the embodiment described before which can be varied widely within the scope of the invention as defined by the claims. Thus the application of the dam is not limited to dikes; also the application in quays or at locations where dikes and/or quays are fully lacking, are possible.

Having described the invention, what is claimed as new and desired to be secured by Letters Patent is:

1. A movable dam for a watercourse, comprising a housing having an inner chamber and a filling channel formed therein, and a selectively vertically movable retaining element having a buoyant bottom portion and an integrally formed and vertically outwardly extending wall portion, said retaining element being disposed at least partly within said chamber and alternately disposable between a first position where at least a portion of the wall portion of said retaining element is disposed within the chamber and the buoyant bottom portion is located in a bottom portion of the chamber, and a second position where a substantial part of the wall portion extends through a slot formed in an upper portion of the housing, and which communicates with the chamber, into the external environment such that the buoyant portion of the retaining element is disposed within a top portion of the chamber, said retaining element being movable between the first and second positions by fluid entering the inner chamber through the filling channel.

2. The dam of claim 1 wherein said filling channel opens onto the top portion of said chamber, and extends upwardly and outwardly therefrom.

3. The dam of claim 1 further comprising a discharge channel formed in said housing and which opens onto the bottom portion of said chamber.

4. The dam of claim 3 further comprising pump means disposed within said discharge channel for pumping fluid from within said chamber to the external environment through said discharge channel.

5. The dam of claim 1 further comprising seal means forming a relatively fluid-tight seal in the upper portion of the chamber about the slot.

* * * * *